US009924769B1

(12) United States Patent
Kim

(10) Patent No.: US 9,924,769 B1
(45) Date of Patent: Mar. 27, 2018

(54) CASE FOR ELECTRONIC DEVICE WITH UPPER AND LOWER HOUSINGS

(71) Applicant: SPIGEN KOREA CO., LTD., Seoul (KR)

(72) Inventor: Dae-Young Kim, Seoul (KR)

(73) Assignee: SPIGEN KOREA CO., LTD., Geumcheon-Gu, Seoul (KR)

( * ) Notice: Subject to any disclaimer, the term of this patent is extended or adjusted under 35 U.S.C. 154(b) by 0 days.

(21) Appl. No.: 15/497,549

(22) Filed: Apr. 26, 2017

Related U.S. Application Data

(60) Provisional application No. 62/305,529, filed on Mar. 8, 2016.

(51) Int. Cl.
| | | |
|---|---|---|
| *H04M 1/00* | (2006.01) | |
| *A45C 11/00* | (2006.01) | |
| *H04B 1/3888* | (2015.01) | |
| *H04M 1/02* | (2006.01) | |
| *H05K 5/02* | (2006.01) | |
| *A45C 13/00* | (2006.01) | |
| *A45F 5/00* | (2006.01) | |

(52) U.S. Cl.
CPC ............ *A45C 11/00* (2013.01); *A45C 13/002* (2013.01); *A45F 5/00* (2013.01); *H04B 1/3888* (2013.01); *H04M 1/0254* (2013.01); *H05K 5/0217* (2013.01); *A45C 2011/002* (2013.01)

(58) Field of Classification Search
None
See application file for complete search history.

(56) References Cited

U.S. PATENT DOCUMENTS

| | | | | |
|---|---|---|---|---|
| 6,594,472 B1 * | 7/2003 | Curtis | ................ | H04M 1/0252 379/428.01 |
| 8,442,604 B1 * | 5/2013 | Diebel | ................ | G03B 17/02 361/679.32 |
| 8,509,864 B1 * | 8/2013 | Diebel | ................ | G03B 17/02 361/679.32 |
| 8,958,857 B1 * | 2/2015 | Kennard | ................ | A45C 11/00 361/679.02 |
| 8,989,826 B1 * | 3/2015 | Connolly | ................ | A45C 1/06 361/679.01 |
| 9,503,148 B2 * | 11/2016 | Meyer | ................ | H04B 1/3888 |
| 2005/0282597 A1 * | 12/2005 | Park | ................ | H04M 1/0237 455/575.4 |

(Continued)

*Primary Examiner* — Tuan A Tran
(74) *Attorney, Agent, or Firm* — Lucem, PC; Heedong Chae

(57) ABSTRACT

A case for an electronic device with upper and lower housings wherein the electronic device has an eject button to release the lower housing from the upper housing, includes an upper part wherein the upper part covers the upper housing; and a lower part wherein the lower part covers the lower housing. The upper and lower parts have a coupling structure to couple the lower part to the upper part by a fricition fit. A friction between the upper and lower parts is strong enough to retain the upper and lower parts together and weak enough to allow separation of the upper and lower parts when the lower housing is released from the upper housing. The upper part includes a button corresponding to a location of the eject button such that pushing the button results in pushing the eject button and thereby releasing the lower housing from the upper housing.

20 Claims, 10 Drawing Sheets

(56) References Cited

U.S. PATENT DOCUMENTS

| | | | |
|---|---|---|---|
| 2013/0220847 A1* | 8/2013 | Fisher | B65D 25/005 |
| | | | 206/216 |
| 2015/0141093 A1* | 5/2015 | Sela | H04B 1/3888 |
| | | | 455/575.8 |
| 2015/0172431 A1* | 6/2015 | Huang | H04B 1/3888 |
| | | | 455/556.1 |
| 2015/0236745 A1* | 8/2015 | Tranchida | H04B 1/3888 |
| | | | 455/575.8 |
| 2015/0365122 A1* | 12/2015 | Kim | H04M 1/21 |
| | | | 455/575.8 |
| 2016/0028430 A1* | 1/2016 | Crawford | H04M 1/0262 |
| | | | 455/575.8 |
| 2017/0062150 A1* | 3/2017 | Annerino | H01H 13/14 |

\* cited by examiner

12

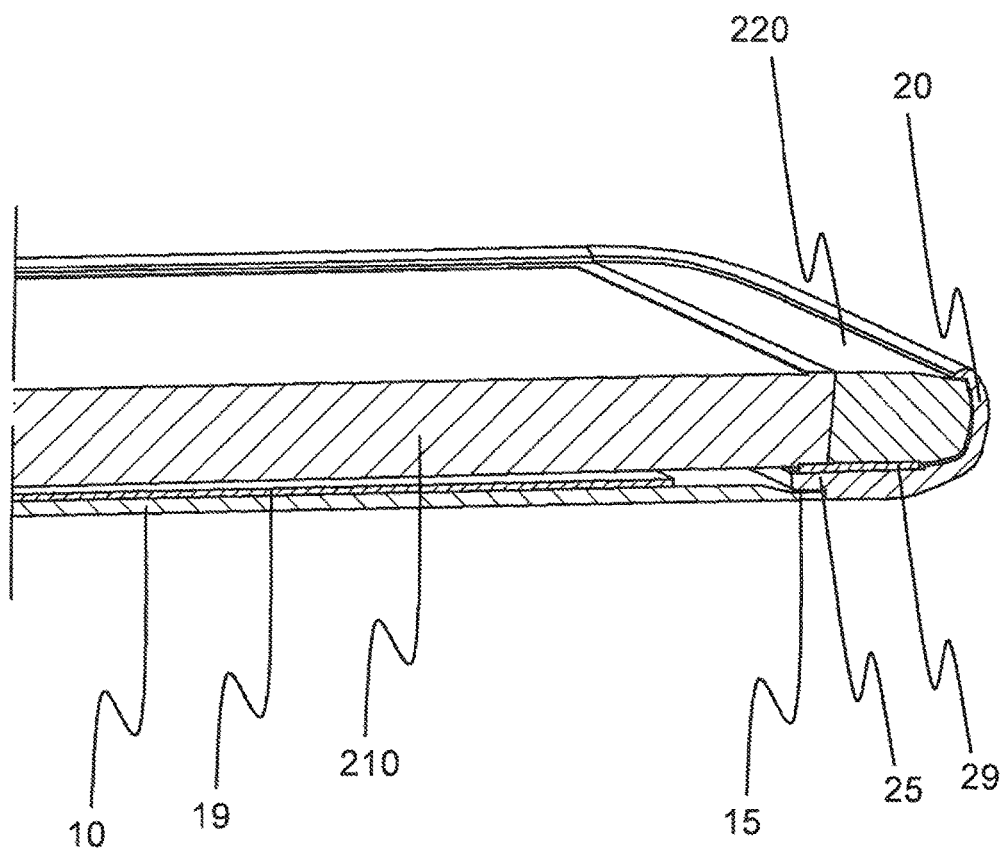

CASE FOR ELECTRONIC DEVICE WITH UPPER AND LOWER HOUSINGS

CROSS-REFERENCE TO RELATED APPLICATIONS

This applicaiton claims priority to U.S. provisional patent application No. 62/305,529, filed on Mar. 8, 2016, the contents of which are incoropated herein by reference.

FIELD OF THE INVENTION

The present invention relates to a case for an electronic device with upper and lower housings wherein the electronic device has an eject button to release the lower housing from the upper housing. The case includes upper and lower parts respectively covering the upper and lower housing.

SUMMARY OF THE INVENTION

LG Electronics (Trademark) developed and released a new Android smartphone, named "LG G5" (Trademark). The G5 was released on Feb. 21, 2016 as the successor to LG Electronics' LG G4. LG Electronics distinguished the LG G5 from its redecessors with an aluminum chassis and a focus on modularity. The lower housing holding the battery can be removed from the bottom of the device, and replaced by alternative add-on modules that provide additional functions, such as a camera grip or a high-fidelity audio module.

The present invention relates to a smartphones case suitable for the LG G5. The LG G5 consists of an upper housing and a lower houisng that can be slidably removed from the bottom of the upper housing. LG G5 includes an eject button to release or eject the lower housing from the upper housing. The present invention further relates to a case for an electronic device having an upper housing and a lower housing, wherein the lower housing may be released from the upper housing by an eject button included on the electronic device.

The case of the present invention includes an upper part and a lower part in which the upper and lower parts respectively cover the upper and lower housing of the electronic device. The upper part further includes a button at a location corresponding to the location of the eject button of the electronic device.

The advantages of the present invention are: (1) the case of the present invention is suitable for an electronic device such as a smartphone having an upper and lower housing wherein the electronic device has an eject button to release the lower housing from the upper housing; (2) the upper and lower parts effectively protect the upper and lower housing; (3) the upper and lower parts are releasable or slidably separable from each other when the upper and lower housings are separated; (4) the battery is easily accessible to be replaced without needing to remove the smartphone case; the (4) different colors are available for the lower part and the lower part can be replaced for various designs and visual effects.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 10 is a corss-sectional view of the present invention along the line 10-10 of FIG. 6.

DETAILED DESCRIPTION OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
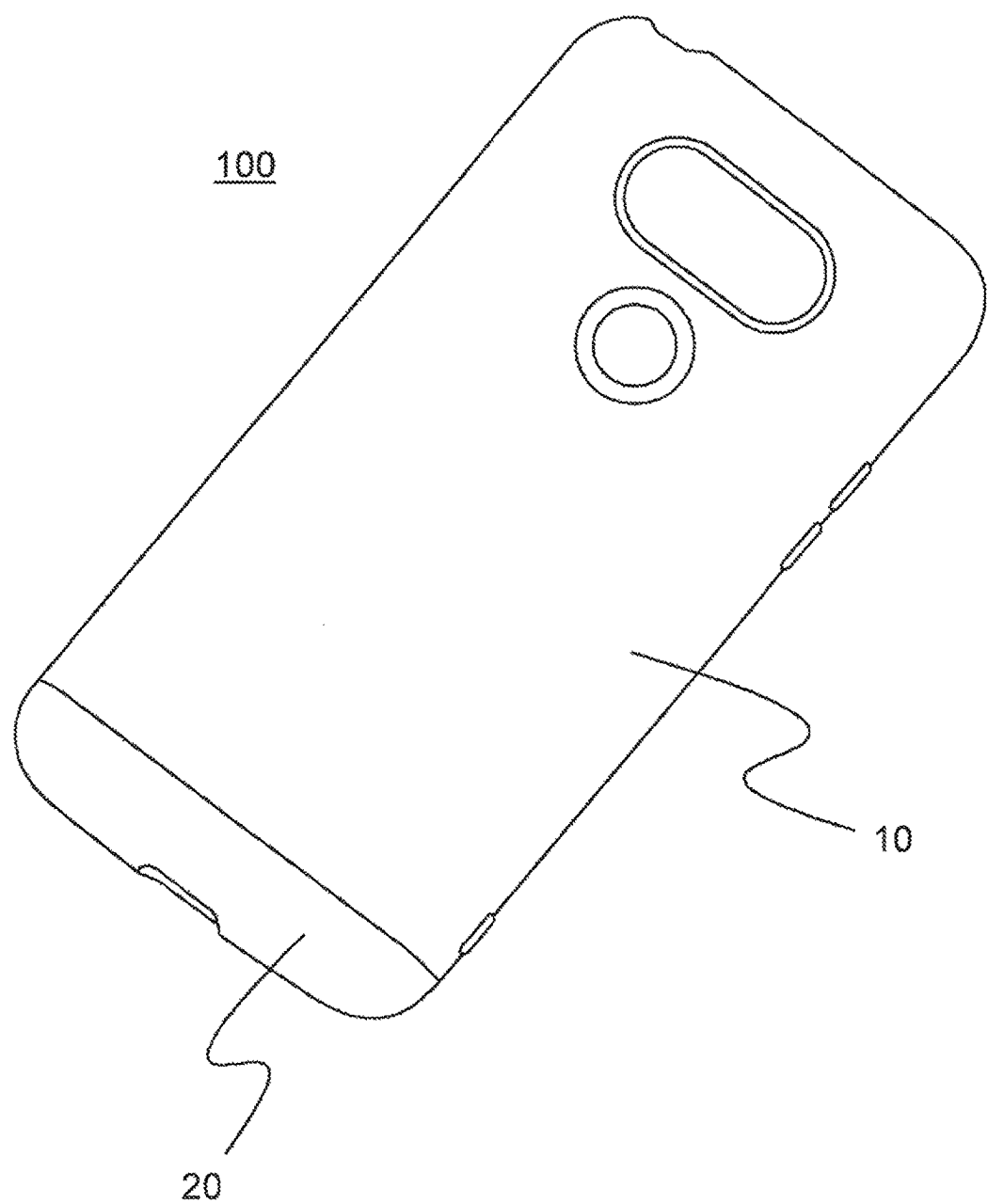
FIGS. 1 is a rear perspective view showing the smartphone case of the present invention.
Figure 2:
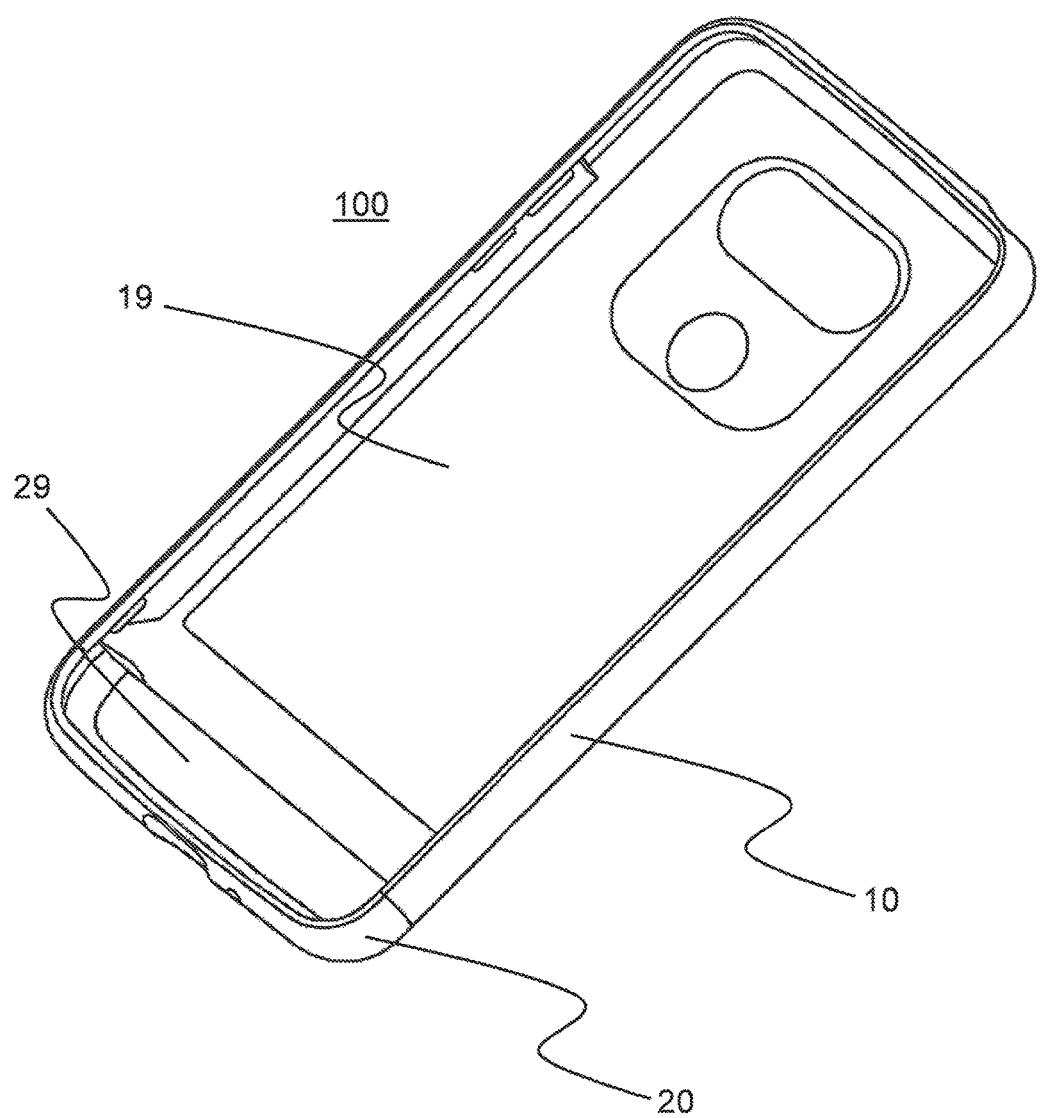
FIG. 2 is a front perspective view thereof.

As shown in FIGS. 1 and 2 of the drawings, a case 100 for an electronic device 200 with an upper housing 210 and a lower housing 220 (shown in FIG. 5), wherein the electronic device has an eject button 230 to release the lower housing 220 from the upper housing 210, may include: an upper part 10 wherein the upper part 10 covers the upper housing 210; a lower part 20 wherein the lower part 20 covers the lower housing 220.

The case 100 may include opending corresponding to a camera lens, another optical sensor, a camera flash, speakers, connection ports, a logo, or other features of the electronic device. The case 100 may also include buttons corresponding to buttons of the electronic device such as a power button, or buttons to adjust volume.

Figure 3:
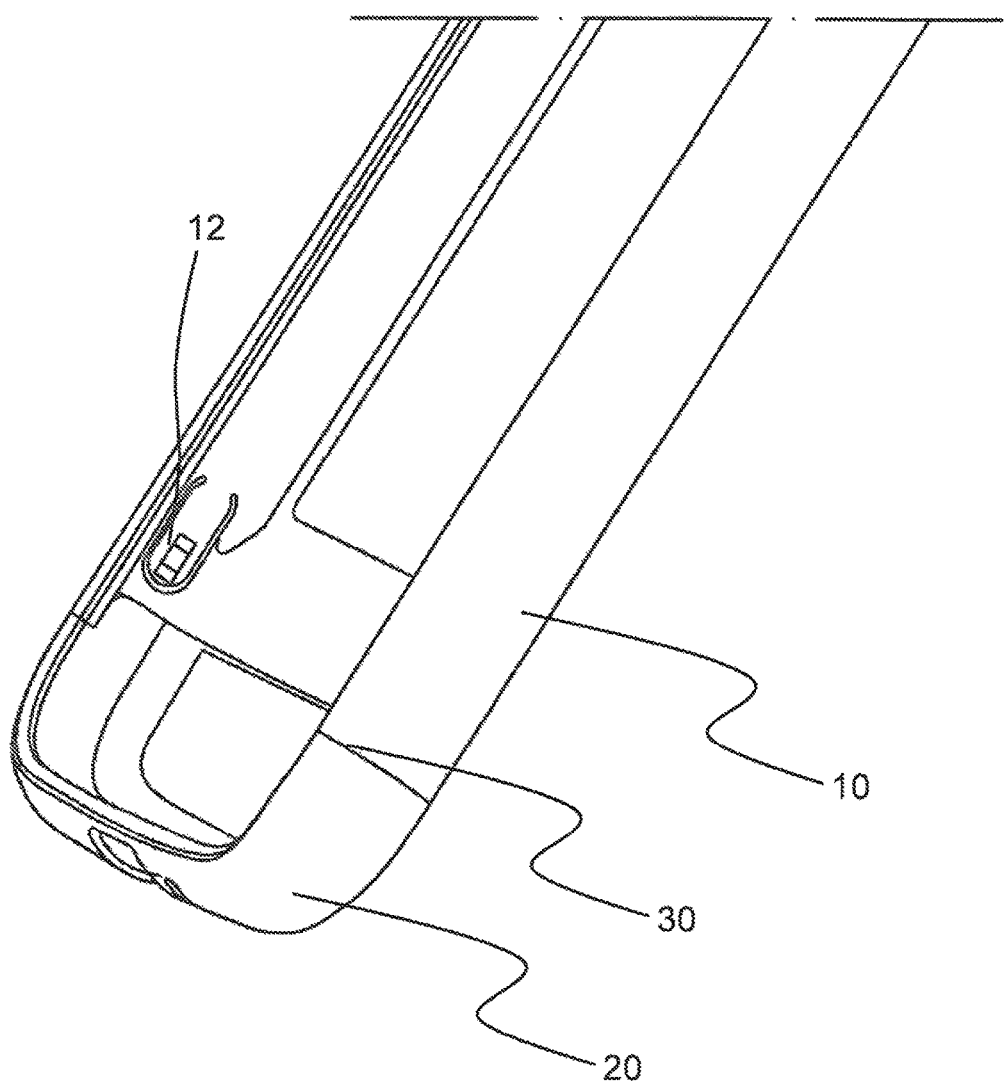
FIG. 3 is an enlarged perspective view of part of the smartphone case.

As shown in FIG. 3, the upper part 10 and the lower part 20 have a coupling structure 30 to couple the lower part 20 to the upper part 10 by a friction fit. The upper part 10 may include a button 12 corresponding to a location of the eject button 230 of the electronic device 200 such that pushing the button 12 results in pushing the eject button 230 and thereby releasing the lower housing 220 from the upper housing 210.

Figure 4:
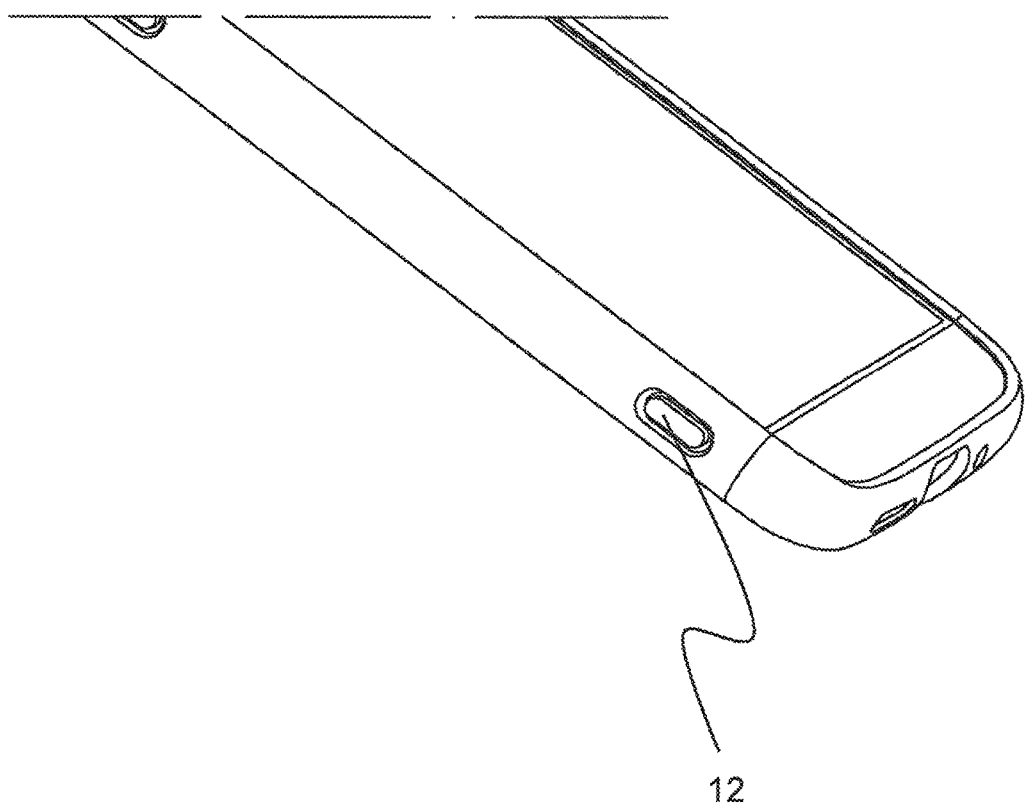
FIG. 4 is an enlarged perspective view of the smartphone case of the present invention with a smartphone inserted therein.
Figure 5:
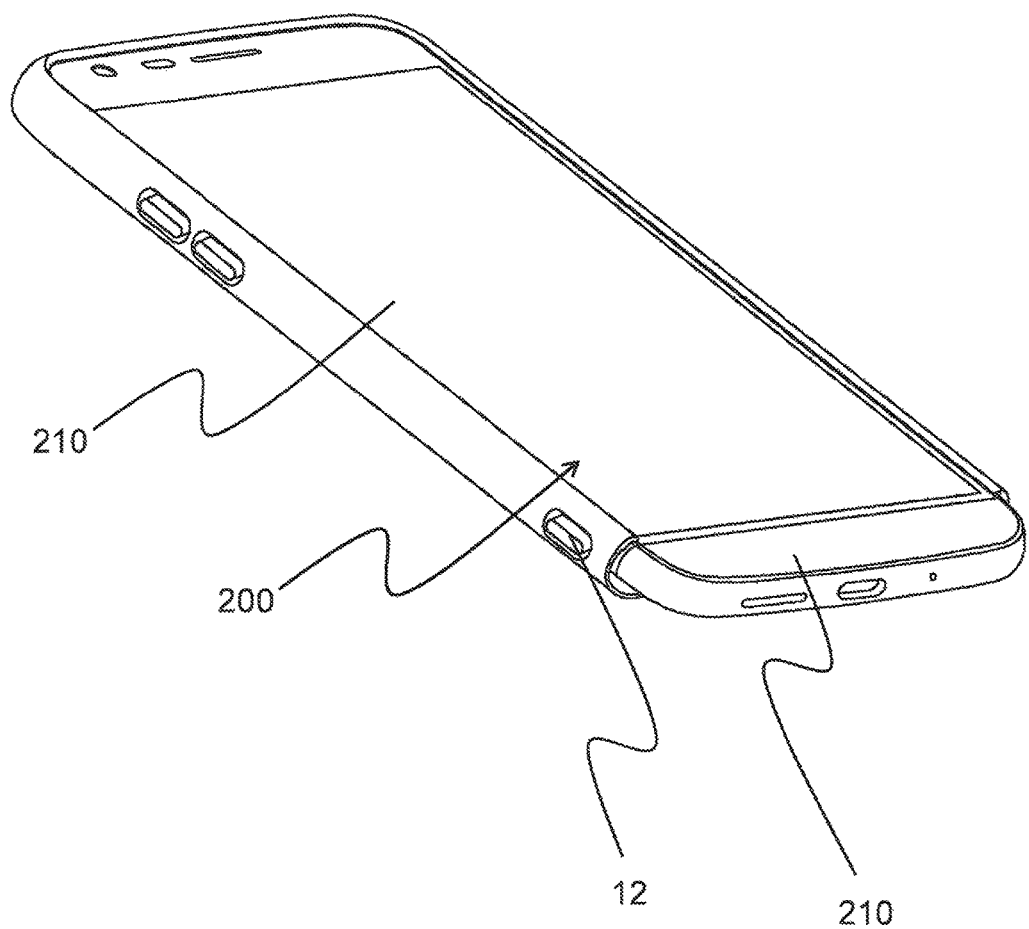
FIG. 5 is a front perspective view of the present invention with the lower part removed and with a smartphone inserted therin.

The exterior of the button 12 is shown in FIGS. 4 and 5. As FIG. 4, the upper part 10 may substantially over sides and a back of the upper housing 210 and the lower part may 20 substantially cover sides and a back of the lower housing 220. FIG. 5 shows only the upper part 10 of the case 100 with an electronic device 200 inserted.

The upper part 10 may be sufficiently flexible to accept insertion of the upper housing 210 therein and sufficiently rigid to securely retained the inserted upper housing 210. The lower part 20 may be sufficiently flexible to accept insertion of the lower housing 220 therein and sufficiently rigid to securely retain the inserted lower housing 220.

The upper part 10 may retain the inserted upper housing 210 therein by a friction fit and the lower part 20 may retain the inserted lower housing 220 therein by a friction fit.

The friction fit between the upper part 10 and the upper housing 210 may be greater than the friction fit between the upper part 10 and the lower part 20.

The friction fit between the lower part 20 and the lower housing 220 may be greater than the friction fit between the upper part 10 and the lower part 20.

Because of such differences in frictional resistance, less force may be required to slide apart the upper part 10 from the lower part 20 than it is to slide off the upper part 10 from the upper housing 210 or the lower part 20 from the lower housing 220.

Figure 6:
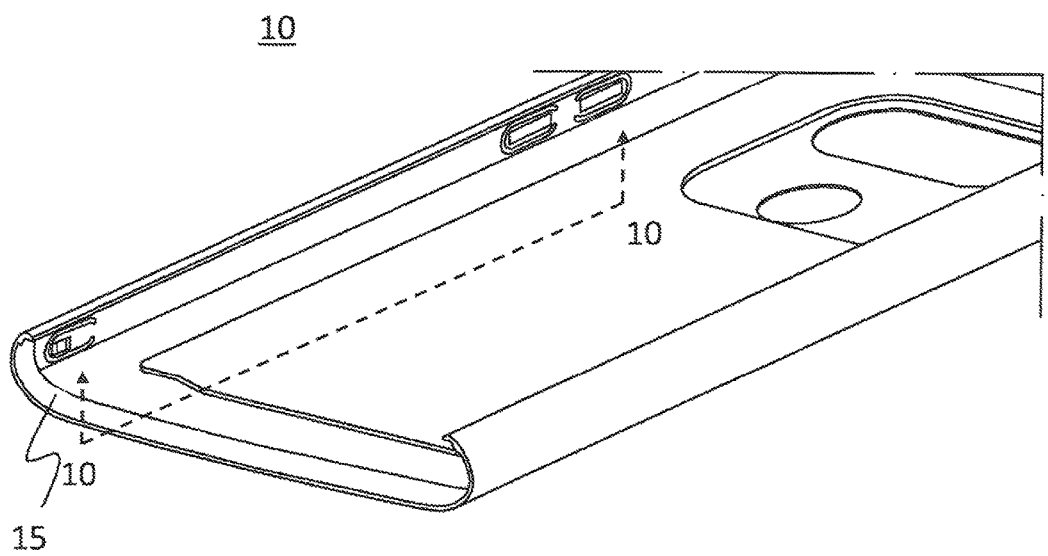
FIG. 6 is a partial front perspective view of the upper part alone.
Figure 7:
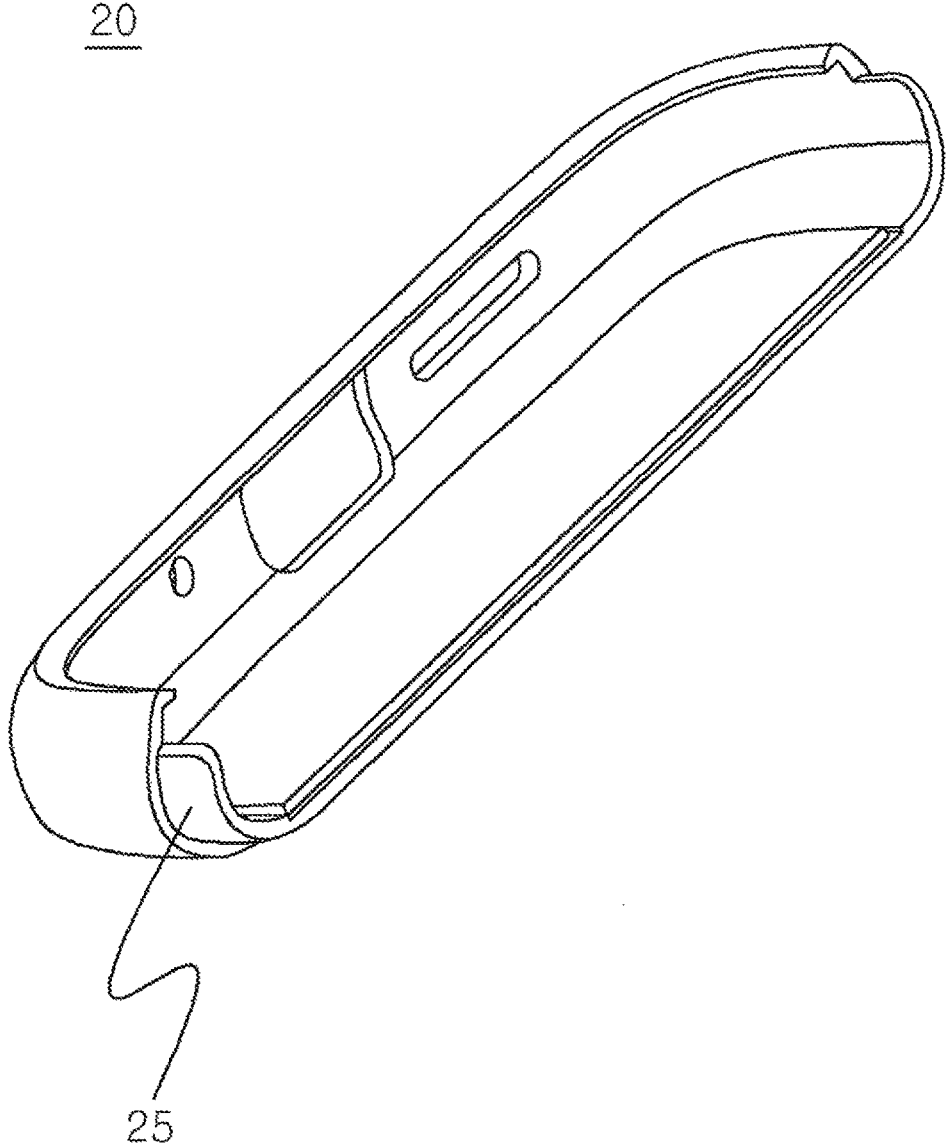
FIG. 7 is a front perspective view of the lower part alone.

FIGS. 6 and 7 show enlarged views of the upper part 10 and the lower part 20, respectively. There may be no locking structure between the upper part 10 and lower part 20; examples of locking structures that are not included in the present invention include a locking protrusion and locking recess mating with each other. The upper part 10 may include a longitudinal recess 15 along a lower boundary of the upper part 10 and the lower part 20 may include a longitudinal protrusion 25 along an upper boundary of the lower part, wherein the longitudinal recess may be adapted to receive the longitudinal protrusion therein to form the coupling structure 30. The coupling struction 30 may include the longitudinal recess 15 and the longitudinal protrusion 25. The longitudinal protrusion 25 and the longitudianl recess 15 may not be visible when the lower part 20 is coupled to the upper part 10 as illsutrated in FIG. 1.

The longitudinal recess 15 may further extend into both sides of the upper part 10 and the longitudinal protrusion 25 may further extend into both sides of the lower part.

Figure 8:
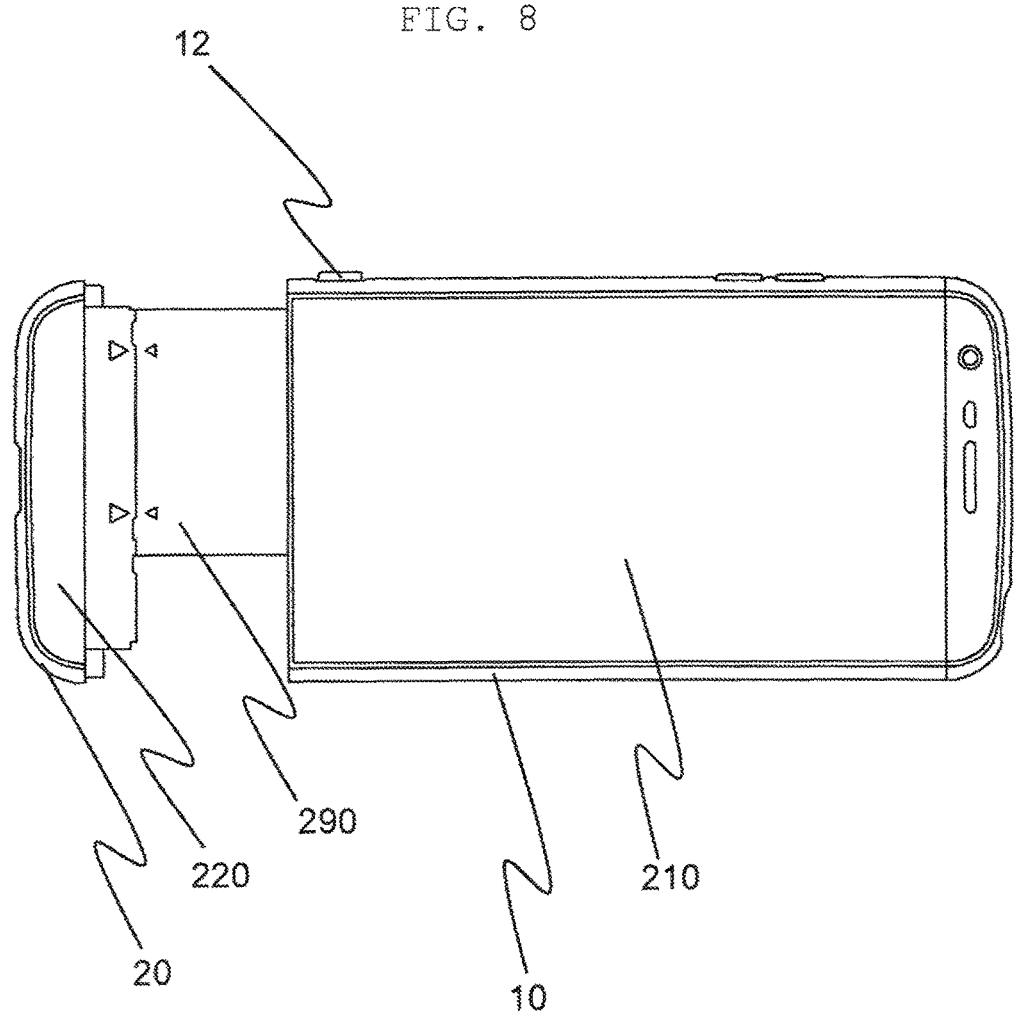
FIG. 8 is a front view of the present invention showing the lower part and the lower housing of the smartphone having the battery being slidably removed from the upper part and the upper housing.

The longitudinal recess 15 and the longitudinal protrusion 25 may be slidably coupled to each other. There may be no locking structure between the longitudinal protrusion 25 and the longitudinal recess 15. Because there is no locking structure the longitudinal protrusion 25 may be slidably separable from the longitudinal recess 15. As shown in FIG. 8, the lower housing 220 of the electronic device 200 may be ejected with lower part 20. By removing the lower housing, the battery 290 of the electronic device 220 may be removed and replaced from the electronic device. The lower housing 220 may be removed by pushing the button 12 of the upper part 10, which in turn pushes the eject button 230 of the electronic device 200.

Figure 9:
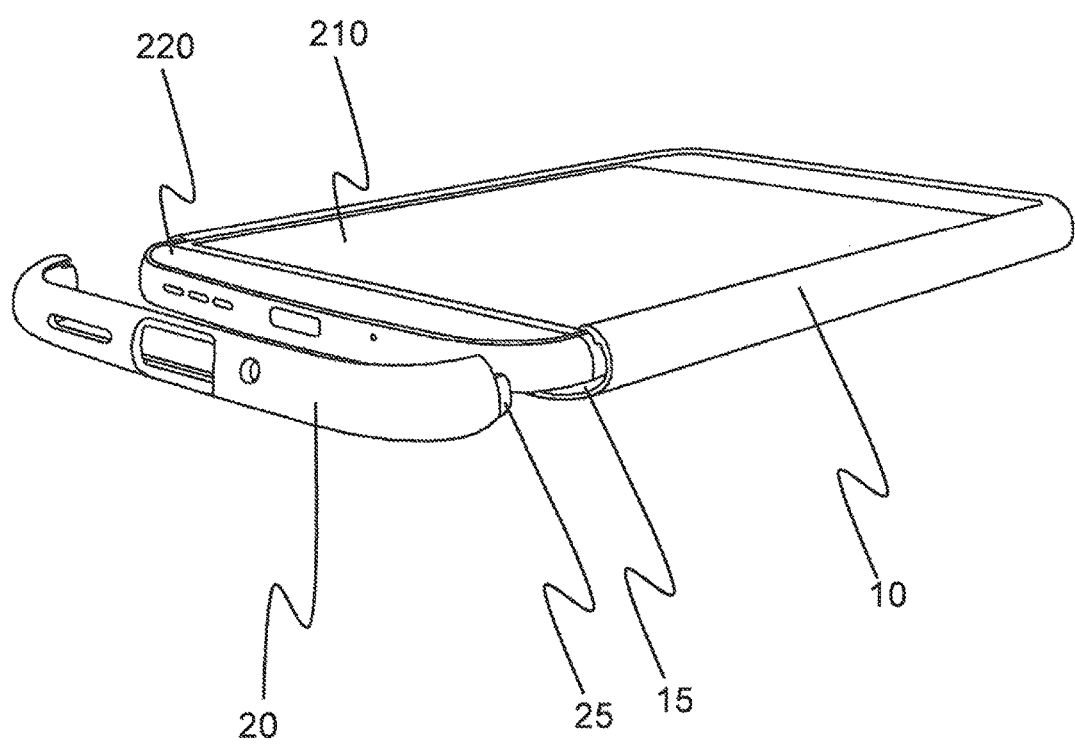
FIG. 9 is a perspective view of the present invention with only the lower part slidably removed from the upper part and the smartphone.

As shown in FIG. 9, the lower part 20 may be slidably removed by itself from the upper part 10 and the lower housing 220. For example, if the button 12 is not pushed, the lower housing 220 may not be ejected and the lower part 20 may be removed by itself.

FIG. 10 shows a cross-sectional view along line 10-10 of FIG. 6. The upper part 10 may include a longitudinally sloped portion so as to provide a smooth appearance at the longitudinal recess 15. A fabric pad 19 may be attached to an inner surface of the upper part 10. A fabric pad 29 may be attached to an inner surface of the lower part 20. Another view of the fabric pads 19 and 29 are shown in FIG. 2. The fabric pads 19 and 29 may be provided to provide fricitional fits of the upper part 10 and lower part 20 to the upper housing 210 and the lower housing 220, respectively. In case the electronic device is dropped, the fabric pads 19 and 29 may provide cushioning and partially absorb the force of shock. The fabric pads 19 and 29 may also protect the surfaces of the upper housing 210 and lower housing 220 from scratches or other superficial damage from the hard surfaces of the case 100.

Alternatively, the upper part 10 may include a longitudinal protrusion 25 along a lower boundary of the upper part 10 and the lower part 20 may include a longitudinal recess 15 along an upper boundary of the lower part 20, wherein the longitudinal recess 15 may be adapted to receive the longitudinal protrusion 25 therein to form the coupling structure 30.

The longitudinal protrusion 25 of the upper part 10 may further extend into both sides of the upper part 10 and the longitudinal recess 15 of the lower part 20 may further extend into both sides of the lower part 20.

Also in this alternative embodiment, there may not be a locking structure between the longitudinal protrusion 25 and the longitudinal recess 15; because there in no locking structure the longitudinal protrusion 25 may be slidably separable from the longtiudinal recess 15. Additionally, the longitudinal protrusion 25 and the longitudinal recess 15 may not be visible when the lower part 20 is coupled to the upper part 10.

Another embodiment of the case 100 for an electronic device with an upper housing 210 and a lower housing 220, wherein the electronic device 200 has an eject button 230 to release the lower housing 220 from the upper housing 210, may include: an upper part 10 wherein the upper part 10 covers the upper housing 210; and a lower part 20 wherein the lower part 20 covers the lower housing 220. The upper 10 and lower 20 parts may have a coupling structure 30 to couple the lower part 20 to the upper part 10 by a friction fit. Friction between the upper and lower parts may be strong enough to retain the upper and lower parts together and weak enough to allow separation of the upper and lower parts when the lower housing is released from the upper housing. The upper part 10 may include a button 12 corresponding to a location of the eject button 230 such that pushing the button 12 results in pushing the eject button 230 and thereby releasing the lower housing 220 from the upper housing 210.

The upper part 10 may include a longitudinal recess 15 along a lower boundary of the upper part 10 and the lower part 20 may include a longitudinal protrusion 25 along an upper boundary of the lower part 20, wherein the longitudinal recess 15 further extends into both sides of the upper part 10 and the longitudinal protrusion 25 further extends into both sides of the lower part 20, wherein the longitudinal recess 15 is adapted to receive the longitudinal protrusion 25 therein to form the coupling structure 30.

There may not be a locking structure between the longitudinal protrusion 25 and the longitudinal recess 15; as such, the longitudinal protrusion may be slidably separable from the longitudinal recess.

The longitudinal protrusion 25 and the longitudinal recess 15 may not be visible when the lower part 20 is coupled to the upper part 10.

Alternatively, the upper part 10 may include a longitudinal protrusion 25 along a lower boundary of the upper part 10 and the lower part 20 may include a longitudinal recess 15 along an upper boundary of the lower part 20, wherein the longitudinal recess 15 is adapted to receive the longitudinal protrusion 25 therein to form the coupling structure 30. The longitudinal protrusion 25 may further extend into both sides of the upper part 10 and the longitudinal recess 15 may further extend into both sides of the lower part 20.

The upper part 10 may substantially cover sides and a back of the upper housing 210 and the lower part 20 may substantially cover sides and a back of the lower housing 220.

The upper part 10 may be sustantially flexible to accept insertion of the upper housing 210 therein and sufficiently rigid to securely retain the inserted upper housing 21 and the lower part 20 may be substantially flexible to accept insertion of the lower housing 220 therein and sufficiently rigid to securely retain the inserted lower housing 220.

The upper part 10 and the lower part 20 may be made of hard plastic.

The upper part 10 and the lower part 20 may be made of polycarbonate.

A fabric pad 19 may be attached to an inner surface of the upper part 10. A fabric pad 29 may be attached to an inner surface of the lower part 20. The fabric pads 19 and 29 may protect the electronic device 200 from scratches and increase friction with the upper or lower part.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case for an electronic device with upper and lower housings, wherein the electronic device has an eject button to release the lower housing from the upper housing, comprising:
    an upper part wherein the upper part covers the upper housing; and
    a lower part wherein the lower part covers the lower houisng,
    wherein the upper and lower parts have a coupling structure to couple the lower part to the upper part by a friction fit;
    wherein the upper part comprises a button corresponding to a location of the eject button such that pushing the button results in pushing the eject button and thereby releasing the lower housing and the lower part form the upper housing and the upper part.

2. The case of claim 1, wherein the upper part substantially covers sides and a back of the upper housing and the lower part substantially covers sides and a back of the lower housing.

3. The case of claim 1, wherein the upper part is sufficiently flexible to accept insertion of the upper housing therein and sufficiently rigid to securely retain the inserted upper housing and the lower part is sufficiently flexible to accept insertion of the lower housing therein and sufficiently rigid to securely retain the inserted lower housing.

4. The case of claim 3, wherein the upper part retains the inserted upper housing therein by a friction fit and the lower part retains the inserted lower housing therein by a friction fit.

5. The case of claim 4, wherein friction between the upper part and the upper housing is greater than the frictional resistance between the upper part and the lower part.

6. The case of claim 4, wherein friction between the lower part and the lower housing is greater than the frictional resistance between the upper part and the lower part.

7. The case of claim 1, wherein the upper part comprises a longitudinal recess along a lower boundary of the upper part and the lower part comprises a longtiudinal protrusion along an upper boundary of the lower part,
    wherein the longitudinal recess is constructed to receive the longitudinal protrusion therein to form the coupling structure.

8. The case of claim 7, wherein the longitudinal recess further extends into both sides of the upper part and the longitudinal protrusion further extends into both sides of the lower part.

9. The case of claim 7, wherein there is no locking structure between the longitudinal protrusion and the longitudinal recess so that the longitudinal protrusion is slidably separable from the longitudinal recess.

10. The case of claim 1, wherein the upper part comprises a longitudinal protrusion along a lower boundary of the upper part and the lower part comprises a longitudinal recess along an upper boundary of the lower part,
    wherein the longitudinal recess is adapted to receive the longitudinal protrusion therein to form the coupling structure.

11. The case of claim 10, wherein the longitudinal protrusion further extends into both sides of the upper part and the longitudinal recess further extends into both sides of the lower part.

12. The case of claim 1, wherein a fabric pad is attached to an inner surface of the upper part.

13. The case of claim 1, wherein a fabric pad is attached to an inner surface of the lower part.

14. The case of claim 1, wherein the upper and lower parts are made of polycarbonate.

15. A case for an electronic device upper and lower housings, wherein the electronic device has an eject button to release the lower housing from the upper housing, comprising:
    an upper part wherein the upper part covers the upper housing; and
    a lower part wherein the lower part covers the lower housing;
    wherein the upper and lower parts have a coupling structure to couple the lower part to the upper part by a friction fit;
    wherein friction between the upper and lower parts is strong enough to retain the upper and lower parts together and weak enough to allow separation of the upper and lower parts when the lower housing is released from the upper housing,
    wherein the upper part comprises a button corresponding to a location of the eject button such that pushing the button results in pushing the eject button and thereby releasing the lower housing from the upper housing,
    wherein the upper part substantially covers sides and a back of the upper housing and the lower part substantially covers sides and a back of the lower housing.

16. The case of claim 15, wherein the upper part comprises a longitudinal recess along a lower boundary of the upper part and the lower part comprises a longitudinal protrusion along an upper boundary of the lower part, wherein the longitudinal recess further extends into both sides of the upper part and the longitudinal protrusion further extends into both sides of the lower part, wherein the longitudinal recess is adapted to receive the longitudinal protrusion therein to form the coupling structure, wherein the longitudinal protrusion and the longitudinal recess and not visible when the lower part is coupled to the upper part.

17. The case of claim 15, wherein the upper part comprises a longitudinal protrusion along a lower boundary of the upper part an upper boundary of the lower part, wherein the longitudinal protrusion further extends into both sides of the upper part and the longitudinal recess further extends into both sides of the lower part, wherein the longitudinal recess is adapted to receive the longitudinal protrusion therein to form the coupling structure, wherein the longitudinal protrusion and the longitudinal recess are not visible when the lower part is coupled to the upper part.

18. The case of claim 15, wherein the upper part is substantially flexible to accept insertion of the upper housing therein and sufficiently rigid to securely retian the inserted upper housing and the lower part is substantially flexible to accept insertion of the lower housing therein and sufficiently rigid to securely retain the inserted lower housing.

19. The case of claim 15, wherein the upper and lower parts are made of polycarbonate.

20. The case of claim 15, wherein a fabric pad is attached to an inner surface of the upper part and a fabric pad is attached to an inner surface of the lower part.

\* \* \* \* \*